(12) United States Patent
Heinrich et al.

(10) Patent No.: US 11,313,394 B2
(45) Date of Patent: Apr. 26, 2022

(54) FIXING DISC AND METHOD FOR INITIALLY FIXING A FASTENING ELEMENT AND REMOVING A PROTECTIVE FILM

(71) Applicant: EJOT Baubefestigungen GmbH, Bad Laasphe (DE)

(72) Inventors: Kostja Heinrich, Bad Berleburg (DE); Erhard Hackler, Bad Berleburg (DE); Ulrich Knebel, Bad Berleburg (DE)

(73) Assignee: EJOT Baubefestigungen GmbH, Bad Laasphe (DE)

( * ) Notice: Subject to any disclaimer, the term of this patent is extended or adjusted under 35 U.S.C. 154(b) by 290 days.

(21) Appl. No.: 16/495,934

(22) PCT Filed: Mar. 24, 2017

(86) PCT No.: PCT/EP2017/057074
§ 371 (c)(1),
(2) Date: Sep. 20, 2019

(87) PCT Pub. No.: WO2018/171895
PCT Pub. Date: Sep. 27, 2018

(65) Prior Publication Data
US 2020/0132098 A1  Apr. 30, 2020

(51) Int. Cl.
*F16B 5/02* (2006.01)
*F16B 43/00* (2006.01)

(52) U.S. Cl.
CPC ............ *F16B 5/0225* (2013.01); *F16B 5/025* (2013.01); *F16B 5/02* (2013.01); *F16B 5/0233* (2013.01);
(Continued)

(58) Field of Classification Search
CPC ........ F16B 5/02; F16B 5/0225; F16B 5/0233; F16B 5/0241; F16B 5/025; F16B 5/0258;
(Continued)

(56) References Cited

U.S. PATENT DOCUMENTS 2,439,516 A  4/1948  Holcomb
3,083,796 A  4/1963  Bell, Jr.
(Continued)

FOREIGN PATENT DOCUMENTS

CN  2651501 Y  10/2004
CN  201439795 U  4/2010
(Continued)

OTHER PUBLICATIONS

Chinese Office Action dated Nov. 30, 2020.
(Continued)

*Primary Examiner* — Roberta S Delisle
(74) *Attorney, Agent, or Firm* — Wood, Phillips, Katz, Clark & Mortimer

(57) ABSTRACT

A fixing disc (1) for initially fixing a fastening element (2) in an opening of a component to be fastened, in particular a facade panel, during mounting of the fastening element (2) and for cutting into and/or removing a defined region of a protective film on the component to be fastened during mounting of the fastening element (2) is described. The fixing disc (1) has a fixing means for initially holding the fastening element (2) in a predetermined position relative to the opening during mounting of the fastening element (2), at least one connecting means (4) for at least temporarily producing a connection between the fixing disc (1) and the fastening element (2), and at least one cutting and/or friction means (5) on that side of the fixing disc (1) which faces the component to be fastened. Furthermore, a fastening element (2) corresponding to the fixing disc (1), a system consisting
(Continued)

of fixing disc (1) and fastening element (2), and a corresponding method for cutting into and/or removing a protective film are described.

15 Claims, 5 Drawing Sheets

(52) U.S. Cl.
CPC ........... *F16B 5/0241* (2013.01); *F16B 5/0258* (2013.01); *F16B 43/00* (2013.01)

(58) Field of Classification Search
CPC ...... F16B 43/00; F16B 43/001; Y10T 403/75; B60R 16/0215; B60R 16/0222
USPC ..................................... 411/533, 546; 16/2.1
See application file for complete search history.

(56) References Cited

U.S. PATENT DOCUMENTS

| | | | | |
|---|---|---|---|---|
| 4,860,513 A * | 8/1989 | Whitman | .............. | E04D 3/3603 52/410 |
| 5,209,621 A * | 5/1993 | Burbidge | ............ | F16B 13/0808 411/340 |
| 5,797,581 A * | 8/1998 | Sherman | ................. | F16B 5/025 248/544 |
| 2001/0022926 A1* | 9/2001 | Kitayama | ............. | F16B 43/001 411/531 |
| 2003/0235465 A1* | 12/2003 | Geringer | .............. | B62D 55/084 403/408.1 |
| 2005/0260061 A1 | 11/2005 | Sung | | |
| 2008/0175689 A1 | 7/2008 | Vagedes | | |
| 2010/0322738 A1* | 12/2010 | Lau | ........................ | F16B 37/125 411/17 |
| 2019/0078599 A1* | 3/2019 | Pinney | .................... | F02K 1/822 |
| 2019/0257093 A1* | 8/2019 | Polk, Jr. | ................ | F16B 41/002 |
| 2020/0096036 A1* | 3/2020 | Stumpf | ............... | B29C 37/0082 |

FOREIGN PATENT DOCUMENTS

| | | |
|---|---|---|
| CN | 201781073 U | 3/2011 |
| DE | 20 2004 000163 U1 | 3/2004 |
| DE | 2020 04 000163 U1 | 3/2004 |
| JP | 2015025312 A | 2/2015 |
| JP | 2017003036 A | 1/2017 |
| RU | 2472984 C2 | 1/2013 |
| RU | 2640465 C2 | 1/2018 |

OTHER PUBLICATIONS

German translation of Chinese Office Action dated Nov. 30, 2020.
Russian Office Action dated Jul. 7, 2020.
EPO Office Action dated May 6, 2021.
International Search Report and Written Opinion dated Nov. 21, 2017.
Chinese Office Action dated Jun. 9, 2021.
International Preliminary Report on Patentability dated Sep. 24, 2019.

* cited by examiner

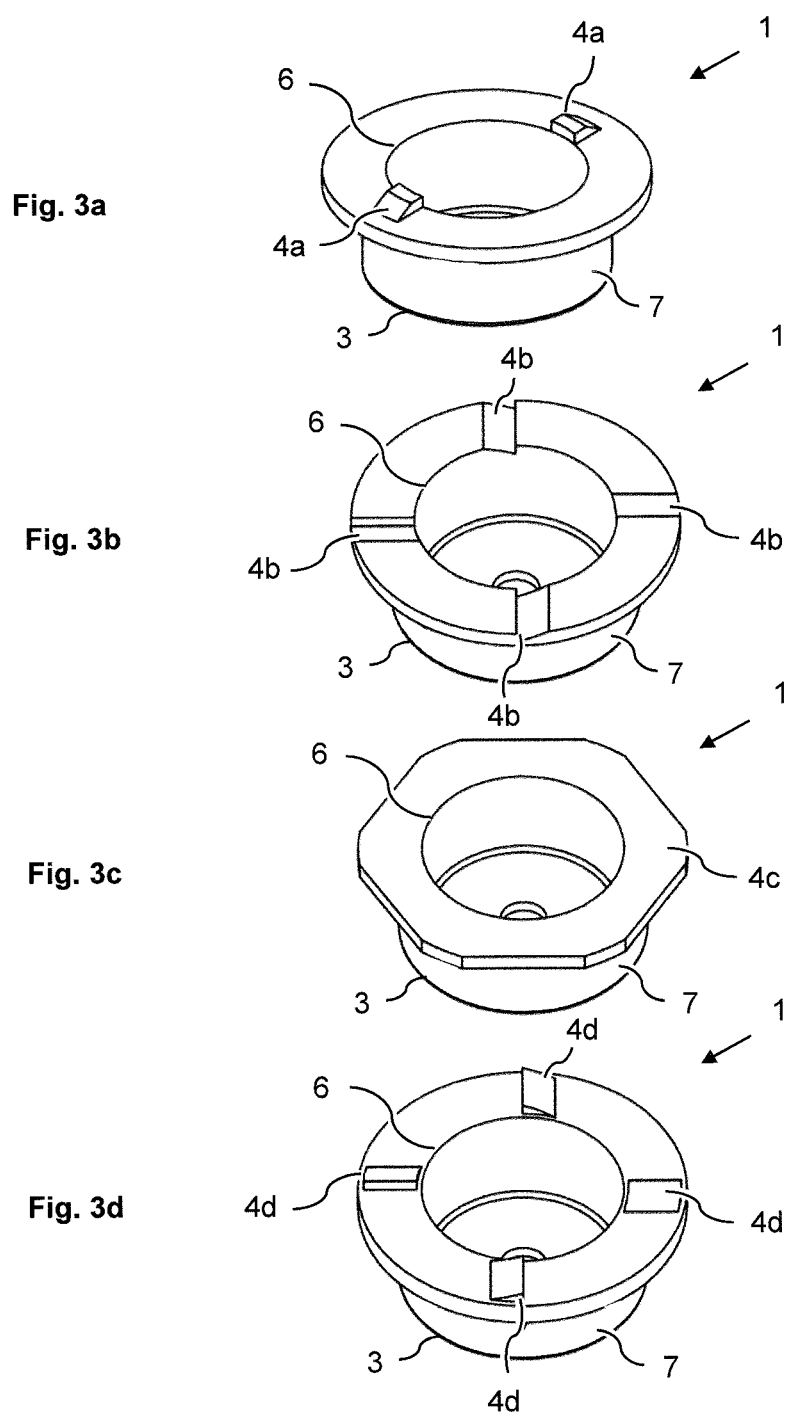

FIXING DISC AND METHOD FOR INITIALLY FIXING A FASTENING ELEMENT AND REMOVING A PROTECTIVE FILM

FIELD OF THE INVENTION

The present invention concerns a fixing disc for the initial fixing of a fastening element in an opening of a component to be fastened, in particular a facade panel, and the removal of a protective film on the corresponding component to be fastened.

BACKGROUND OF THE INVENTION

Facade panels are fastened to an underground or substructure using various means. There are fastening points at which the facade panel is fixed, i.e. fastened exactly at the respective point on the underground or substructure, and there are points at which the facade panel is fastened to the underground or substructure in a sliding and force-free manner in the plane of the panel. In contrast to fixed fixing, sliding fixing allows the facade panel to move relative to the fastening point. This is a movement parallel to the flat extension of the surface of the facade panel. Since a facade panel is exposed to a wide range of temperatures and other environmental influences, it changes relative to the underground or substructure. In order to keep the facade panels free of constraints despite such influences, the facade panels are at least partially fastened in a sliding manner.

A sliding fixing can be achieved if the diameter of an opening in the facade panel in which a fastening element is arranged is larger than the diameter of the cross-section of the fastening element. This results in a free space between the fastening element and the edge of the opening, which allows the facade panel to move relative to the fastening element. In order for the facade panel to have the desired freedom of movement in all directions, it is important that the fastening element is mounted in a predetermined position, preferably in the middle of the opening.

Protective foils are mounted on the well-known facade panels to protect the surface during transport and assembly. These protective films should remain on the facade panels for as long as possible to prevent damage. However, after a fastening element has been mounted, at least part of this protective film is squeezed between the head of the fastening element and the facade panel. If the protective film is then removed, the remains of the protective film usually remain around the fastening points on the facade panel. Removing these residues of the protective film requires a considerable amount of time and involves a considerable risk of damage. For this reason, part of the protective film is usually removed before the fastening element is mounted, i.e. where the fastening element is mounted. This not only requires additional time, but also carries the risk that the surface of the facade panel is unprotected in at least this part and is damaged or scratched, for example, when the fastening element is mounted.

Based on this, the task is to provide an aid that can be used to simplify the assembly of components, in particular facade panels, on an underground or substructure.

SUMMARY OF THE INVENTION

According to the invention, the task is solved by the fixing disc, the fastening element, the system and method of the independent claims. Preferred embodiments result from the dependent claims and from the following description.

The task is solved according to the invention by a fixing disc for initially fixing a fastening element in an opening of a component to be fastened, in particular a facade panel, during mounting of the fastening element and for cutting and/or removing a defined region of a protective film on the component to be fastened during mounting of the fastening element. The fixing disc is therefore used to initially center the fastening element before or during the mounting of the fastening element. The fixing disc also serves to remove and/or cut in at least a part of a protective film located below the fixing disc on the component to be fastened by the fastening element, so that after fastening, the remaining protective film can simply be removed without the remains of the protective film having to be removed individually at the fastening points. The fixing disc also ensures that there is no direct contact between the fastening element head and the component to be fastened, which could otherwise lead to damage to the paintwork or its surface finish. The fixing disc according to the invention comprises a fixing means, whereby the fixing means holds the fastening element in a predetermined position relative to the opening when the fastening element is mounted. In the context of this invention, a fixing means points to a means which assists the operator in mounting the fastening element to mounte the fastening element at a predetermined position relative to the opening. Preferably, it assists the operator in mounting the fastening element centrally in the opening, i.e. so that the same distance prevails from the fastening element to the edge of the opening. The fastening element will hold the fastening element in the predetermined position at least during initial mounting. For example, the fixing means may be positioned substantially centrally of the fixing disc and designed to hold the tip of the fastening element substantially in the same position or region at least at the beginning of mounting. The fixing means itself may, for example, be a central opening in the fixing disc and a means for holding the fixing disc in a specific position with respect to the opening in the component to be fastened. For example, the fixing means can be a part of the fixing disc which is height offset with respect to the rest of the fixing disc. For example, a sleeve-like extension may be formed between the fixing disc and the fixing means. This sleeve-like extension can have a diameter that essentially corresponds to the diameter of the opening in the component to be fastened, so that the sleeve-like extension can be used to fix the fixing disc relative to the opening. The fixing means can then be designed in such a way that it holds and guides the fastening element at least initially centred in the sleeve-like extension. In this case, for example, the fixing means can be formed by inwardly extending ribs on the inner wall of the sleeve-like extension. Alternatively or additionally, in this case the fixing means may also be formed by the base of the sleeve-like extension in which there is a hole or central opening which permits centring of the fastening element at least initially. For example, the fastening element can only initially center the fastening element until the fastening element has at least some hold in the underground or substructure. If there is a certain amount of hold, further centering is no longer necessary, i.e. from this point the fixing means no longer needs to exert any holding effect. Accordingly, the fixing means can also be completely or partially destroyed when the fastening element is mounted.

The fixing disc in accordance with the invention further comprises at least one connecting means for at least temporarily producing a connection between the fastening element and the fixing disc, as well as at least one cutting and/or friction means on that side of the fixing disc which faces the component to be fastened. The connecting means serves, for example, to create a form-fit and/or force-fit connection between the fastening element and the fixing disc, so that a rotational movement of the fastening element is also transmitted to the fixing disc. The rotation of the fixing disc moves the cutting and/or friction means over the component to be fastened and in particular over the protective film. This removes at least part of the protective film. Removed in this case means that either a part of the protective film is completely removed or is only partially removed if, for example, a friction means is used. Removal in this context can also mean that the protective film is cut, for example if a cutting means is used. In this case, the protective film is removed where the cut or cuts are made. The rest of the protective film can then simply be removed in a further step. The protective film is removed by the fixing disc at least in such a region, which essentially corresponds to the expansion of the fixing disc or the covering of the opening by the fixing disc. This means that the rest of the protective film can easily be removed, because it is no longer substantially squeezed between the fixing disc or fastening element head and the component to be fastened.

Accordingly, the fixing disc according to the invention allows to fasten a component with a fastening element centered in an opening in one operation, whereby at the same time a protective film possibly attached to the component is removed from a fixing disc at least in such a way that the rest of the protective film can be removed without large effort and, in particular, can be removed in such a way that no residues of the protective film remain around the opening in the component to he fastened.

In a preferred embodiment of the fixing disc, it comprises a diameter which is larger than the diameter of the opening in the component to be fastened. This means that at least one part of the fixing disc rests on the component to be fastened. The cutting and/or friction means is preferably designed in such a way that it is able to remove a protective film at least in the covered region.

In another preferred embodiment of the fixing disc, the fixing means is formed by a central opening in the fixing disc and at least one holding means arranged in the central opening. For example, ribs or other means designed to hold the fastening element centered in the central opening extend into the central opening. A truncated cone extension may also extend from the central opening, the smaller diameter of which may substantially correspond to the diameter of the cross-section of the fastening element and the corresponding end of the truncated cone extension may then hold the fastening element centred. However, it is also possible that a sleeve-like extension extending from the central opening is larger in diameter than the cross-section of the fastening element. In the sleeve-like extension, holding means maybe arranged in the form of ribs extending to the centre of the sleeve which hold the fastening element centred. Alternatively or additionally, the sleeve-like extension may have a base on the side remote from the fixing disc, which comprises a central opening. The diameter of the opening is adapted to correspond essentially to the diameter of the cross section of the tip or drill tip or to the cross section of the fastening element so that it is held centered.

In another preferred embodiment of the fixing disc, the connecting means is designed in such a way that it produces a form-fit or force-fit connection between the fixing disc and the fastening element, so that the fixing disc performs a movement in the same direction as the fastening element.

The connection can be detachable, i.e. the connection can be reversible. However, the person skilled in the art is aware that if the connection is released, the fastening element is also released and accordingly this has no or only a reduced fastening effect. The connection between the fixing disc and the fastening element causes the fixing disc to rotate when the fastening element is turned. For example, a form-fit connection can be made in such a way that at least two complementary fastening elements are formed on the fixing disc and the fastening element or fastening element head, for example complementary projections and recesses. Either only the fixing disc can have recesses and the fastening element can have corresponding projections which can be accommodated by these recesses, or vice versa. However, it is also conceivable that the fixing disc and the fastening element each have recesses and projections that can interact to produce a form-fit connection. Even if several projections and recesses are mentioned here, the person skilled in the art is aware that it can only be one projection and one recess, but also that the number of projections and recesses need not correspond. It is also conceivable, however, that a force-fit connection, i.e. a frictional connection, is produced. This means that a static friction is applied between the fixing disc and the fastening element which is so large that the fixing disc performs a movement in the same direction as the fastening element. For this purpose, the fixing disc on the side remote from the component to be fastened can be at least partially designed in such a way that this side or the parts have a coefficient of friction which is so high that sufficient static friction can he generated to rotate the fixing disc. For example, this side of the fixing sheath or these parts of the fixing disc may have a higher coefficient of friction than the rest of the fixing disc. For example, the material of the fixing disc in these parts can be roughened. Alternatively or additionally, the fixing disc in these parts can be coated with a sticky material.

In a preferred embodiment, the fixing disc is made of plastic and monolithically constructed as an injection-moulded part.

The task of the present invention is also solved by a fastening element according to the invention for fastening components, in particular facade panels, whereby the fastening element comprises a first end region for anchoring the fastening element in an underground or in a substructure. This end region can also be referred to as the anchoring region and can have a thread which can either directly or indirectly anchor the fastening element in the underground or in the substructure. In the case of direct anchoring, the thread of the fastening element has direct contact with the underground or substructure, i.e. it is driven directly into the underground or substructure and thus unfolds the anchoring effect. In the case of indirect anchoring, the thread has no direct contact with the underground or substructure, but causes, for example, an expansion of an anchor introduced in the underground or substructure. In this case, the anchoring effect is ensured by the corresponding expansion.

The fastening element according to the invention also has a second end region on which a fastening element head is arranged. The fastening element head comprises a larger diameter than the diameter of the cross-section of the first end region. The fastening element head also comprises at least one connecting means on the side which faces the first end region for producing a connection between the fastening element head and a fixing disc. For this purpose, the fastening element can be designed, for example, in such a way that it produces a form-fit or force-fit connection between the fastening element head and the fixing disc. For this purpose, the fastening element head may have projections and/or recesses which form the connecting means and which may cooperate with complementary recesses and/or projections on the fixing disc to produce a form-fit connection. The connection can be detachable, i.e. the connection can be reversible. Even if several projections and recesses are mentioned here, the person skilled in the art is aware that it can only be one projection and one recess, but also that the number of projections and recesses does not have to correspond. It is also conceivable that the head of the fastening element and the fixing disc form a force-fit connection. For this purpose, the fastening element head on the side which faces the first end region can be designed in such a way that this side at least partially has a coefficient of friction which is so high that sufficient static friction can be generated to rotate the fixing disc. For example, this side may have at least partially a higher coefficient of friction than the rest of the fastening element for producing a force-fit connection with the fixing disc. With the connection between the fastening element and the fixing disc, a rotational motion applied to the fastening element can also be transferred to the fixing disc.

In a preferred embodiment of the fastening element according to the invention, the fastening element has a holder for a mounting tool at the fastening element head, so that torque can be applied from the mounting tool to the fastening element and the fastening element can be mounted. This mounting may be hexagonal, torx-shaped, or otherwise.

The above-mentioned task is also solved by a system consisting of at least one of the fixing disc according to the invention, at least one fastening element according to the invention and a facade panel with a protective film arranged on it. The person skilled in the art is aware that the system also includes the case when the protective film has already been removed, i.e. the facade panel which previously had the protective film no longer has any protective film after removal of the protective film or only the remains of the protective film which remain underneath the fixing discs.

The above-mentioned task is also solved by a method for cutting and/or removing a defined region of a protective film on a component to be fastened, in particular a facade panel, when mounting a fastening element in an opening in the component to be fastened. The method involves arranging a fixing disc at least partially in the opening in the component to be fastened and arranging the fastening element in the region of a fixing means of the fixing disc. Furthermore, the method comprises mounting the fastening element by rotating the fastening element, wherein during the mounting of the fastening element at least temporarily a form-fit or force-fit connection is produced between the fastening element and the fixing disc, so that the rotation of the fastening element is transmitted to the fixing disc and the fixing disc rotates. The rotation cuts and/or removes the protective film on the component to be fastened by at least one cutting and/or friction means on the side of the rotating fixing disc which faces the component to be fastened.

In a preferred embodiment, the method further comprises removing the remaining protective film around the defined region that has been removed by the fixing disc.

The invention will be explained in more detail below using embodiment examples from the enclosed drawings. The embodiment examples described below provide further details, features and advantages of the subject matter of the invention.

BRIEF DESCRIPTION OF THE DRAWINGS

FIG. 3a-d show perspective top views of various embodiment examples of the fixing disc according to the invention;

DETAILED DESCRIPTION OF THE PREFERRED EMBODIMENT

Figure 1:
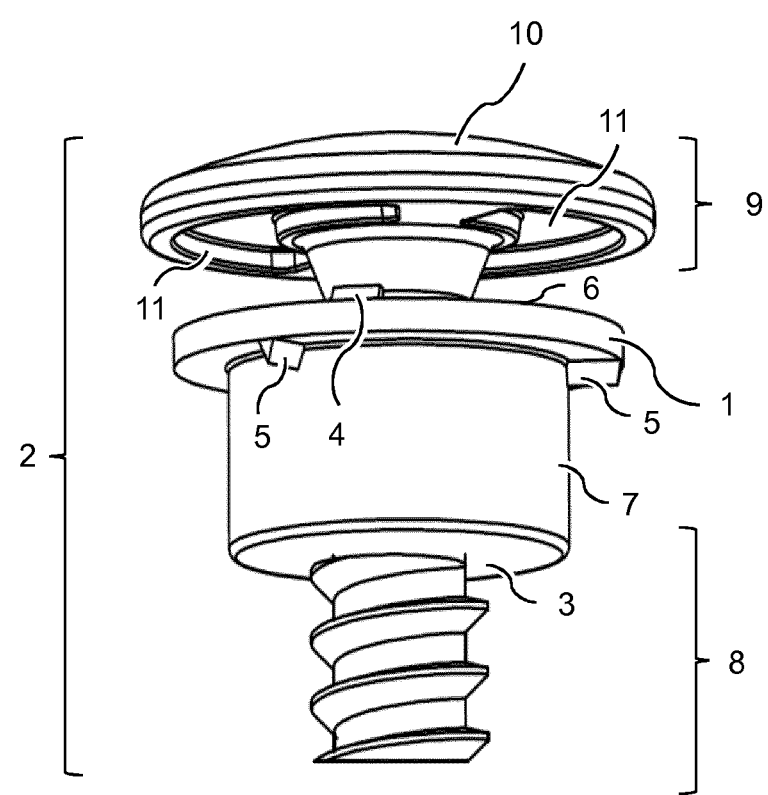
FIG. 1 shows a perspective view of an embodiment example of a fixing disc according to the invention with a fastening element according to the invention.
Figure 2A:
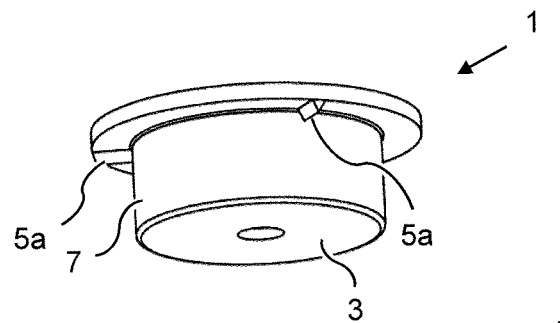
FIG. 2a-d show perspective views from beneath of various embodiment examples of the fixing disc according to the invention.
Figure 2B:
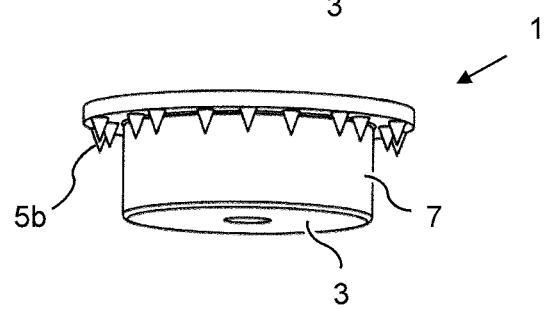
Figure 2C:
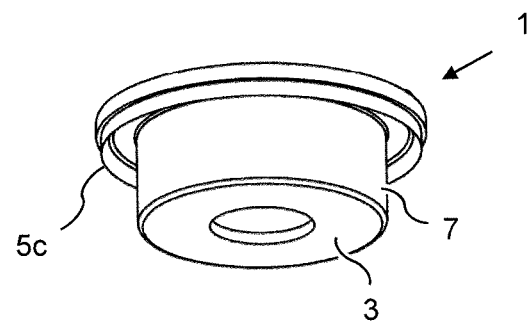
Figure 2D:
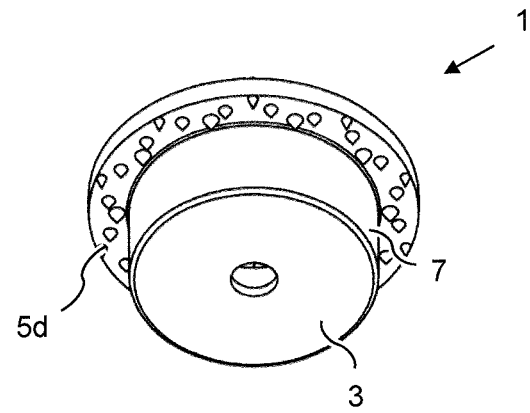
Figure 4A:
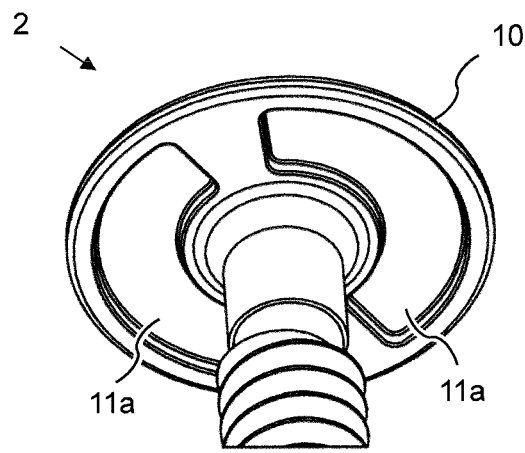
FIG. 4a-d show perspective views from beneath of various embodiment examples of the fastening element according to the invention.
Figure 4B:
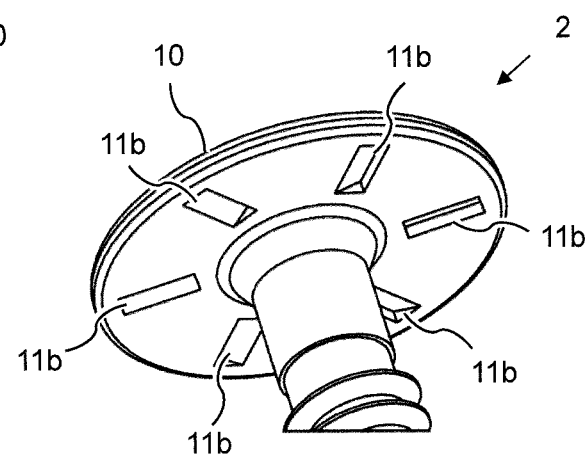
Figure 4C:
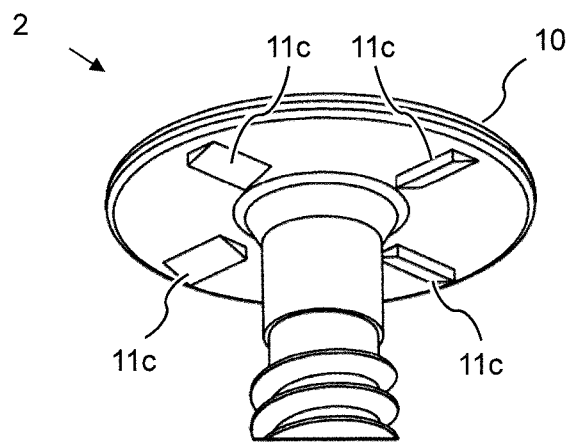
Figure 4D:
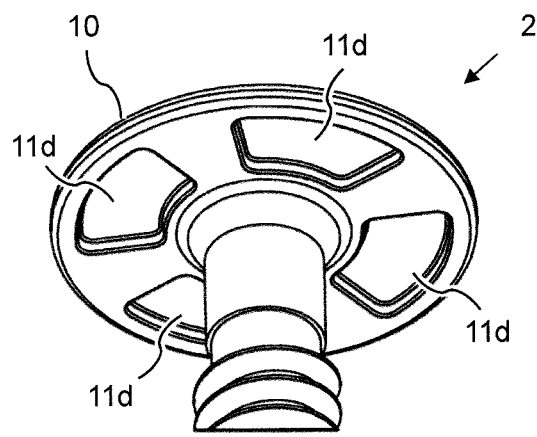

FIG. 1 shows a perspective view of an embodiment example of a fixing disc 1 according to the invention with a fastening element 2 according to the invention.

In the embodiment example shown here, the fixing disc 1 is designed as a disc with a central opening 6 through which the fastening element 2 extends. It can also be said that the fixing disc 1 is ring-shaped. In the embodiment example shown here, a sleeve-like extension 7 extends away from the central opening 6 and surrounds at least part of the fastening element 2. The sleeve-like extension 7 preferably comprises a diameter which is larger than the cross-section of the fastening element 2, so that the sleeve-like extension 7 is not contacted by the fastening element 2. However, the diameter of the sleeve-like extension 7 can be adapted in such a way that it corresponds substantially to a diameter of an opening or a hole in a component to be fastened, in particular a facade panel. The fixing disc 1 can have a diameter that is larger than the opening. This means that the sleeve-like extension 7 can be introduced into the opening, whereas the fixing disc 1 rests on the component to be fastened. At the end of the sleeve-like extension 7 opposite the fixing disc 1 a fixing means is arranged which is designed to hold the fastening element 2 centrally in the central opening 6 of the fixing disc 1 and to guide it if necessary. I.e. the fixing means ensures that the fastening element 2 has a defined distance from the sleeve-like extension 7 and accordingly has a defined distance from the edge of the opening in the component to be fastened, so that a sliding fixing is possible. In the embodiment example shown here, the fixing means is designed as the base of the sleeve-like extension 7 and has a central opening which can essentially correspond to the cross-section of the fastening element 2. The base with the central opening can also be referred to as holding means 3, because this holds the fastening element 2.

In the embodiment example shown here, the fastening element 2 has a first end region 8, which serves to anchor the fastening element 2 in an underground or in a substructure. In the embodiment example shown here, the fastening element 2 has a thread at this first end region 8. With this thread, the fastening element 2 can either be anchored directly in the underground or in the substructure, or it can be anchored in the underground or in the substructure with the aid of a dowel.

In the embodiment example shown here, the fastening element 2 comprises a second end region 9 which comprises a fastening element head 10 at which the diameter of the cross-section of the fastening element 2 increases and essentially corresponds to the diameter of the fixing disc 1.

Since in the embodiment example shown here the fixing disc 1 has a larger diameter than the sleeve-like extension 7, the fixing disc 1 will rest on the edge of an opening of the component to be fastened when the sleeve-like extension 7 is introduced into the opening. On the side which faces the component to be mounted, the fixing disc 1 in the embodiment example shown here has protruding serrations 5 which extend in the direction of the component to be fastened. In the embodiment example shown here, these protruding serrations 5 extend from the sleeve-like extension 7 to the edge of the fixing disc 1.

The serrations 5 shown in the embodiment example shown here serve as cutting and/or friction means and are adapted to remove a protective film located on the component to be fastened in a defined region around the opening. The removing is done by turning the fixing disc 1 when mounting the fastening element 2. For this, in the embodiment example shown here, the fixing disc 1 comprises a projection 4 on the side remote from the component to be fastened, which can engage in a corresponding recess 11 in the fastening element head 10 when the fastening element 2 is rotated and contacts the fixing disc 1. The projection 4 can also be described as a connecting means, which produces a form-fit connection with the recess 11 on the fastening element head 10. The design of the connecting means 4 can be arbitrary, it only has to be designed in such a way that an at least temporarily form-fit or force-fit connection is produced between the fixing disc and the fastening element 2, so that a rotational movement exerted on the fastening element 2 is transmitted to the fixing disc 1 and the cutting and/or friction means 5 of the fixing disc 1 carries out a sufficient number of rotations to remove or cut in the protective film located between the fixing disc 1 and the component to be fastened. The person skilled in the art is aware that the fixing disc 1 can be rotated even if the first end region 8 of the fastening element 2 touches the opening in extension 7. This can result in temporary clamping or friction between the first end region 8 of the fastening element 2 and the opening, so that such a large force is exerted on the fixing disc 1 that it is rotated.

FIG. 2 shows perspective views from beneath of various embodiment examples of the fixing disc 1 according to the invention with different types of cutting and/or friction means 5, which can be used to remove or cut the protective film. FIG. 2a, for example, shows the design of the cutting and/or friction means 5 as elongated serrations 5a extending in the direction of the component to be fastened, tapering away from the fixing disc 1 and merging into a friction edge. The friction edges of the respective serrations 5a are moved over the component to be fastened when the fixing disc 1 is rotated and rub the protective film away. FIG. 2b shows, for example, the design of the cutting and/or friction means 5 as mandrels 5b extending in the direction of the component to be fastened. These mandrels 5b can, for example, be arranged on the outer edge of the fixing disc 1 and can remove a defined ring region of the protective film when the fixing disc 1 is turned. It is also possible that the mandrels 5b are arranged irregularly on the side of the fixing disc 1 which faces the component to be fastened, so that the mandrels 5b virtually tear away the protective film underneath the fixing disc 1 when the fixing disc 1 is turned when mounting the fastening element 2. FIG. 2c, for example, shows the design of the cutting and/or friction means 5 as a circumferential cutting edge 5c extending in the direction of the component to be fastened. This circumferential cutting edge 5c is able to cut the protective film into a ring when the fixing disc 1 is turned, so that the region of the protective film which lies below the fixing disc 1 is separated from the remaining protective film. Even if the circumferential cutting edge 5c shown here is shown as continuous, the person skilled in the art will understand that an incision can also be caused by an interrupted cutting edge 5c. FIG. 2d, for example, shows the design of the cutting and/or friction means 5 as graining 5d, which is arranged on the side of the fixing disc 1 which faces the component to be fastened. The graining 5d is used to grind away the protective film when the fixing disc 1 is turned when mounting the fastening element 2. The person skilled in the art is aware that even if explicit embodiment examples of the cutting and/or friction means 5 are shown here, these can also be designed differently and the corresponding embodiment examples are only shown here as embodiment examples. The term cutting and/or friction means 5 should therefore cover everything that is suitable for removing at least part of the protective film, be it by rubbing, grinding, milling or cutting.

To enable the cutting and/or friction means 5 to remove at least part of the protective film, the fixing disc 1 must rotate in the same direction as the fastening element 2. For this purpose, the fastening element 2 is connected to the fixing disc 1 at least temporarily, for example via a form-fit or a force-fit connection. In the case of a form-fit connection, for example, at least one connecting means 4 on or on the fixing disc 1 is designed in such a way that it has a complementary shape to a connecting means 11 located on the fastening element head 10. If the two fastening elements 4 and 11 are moved towards each other, one fastening element 4 or 11 can receive the other fastening element 11 or 4 so that a form-fit connection is obtained. The torque exerted by a mounting tool on the fastening element 2 can be transmitted to the fixing disc 1 via this form-fit connection so that the fixing disc 1 also rotates. It is also conceivable that the shape of the fixing disc itself serves as a connecting means 4. This means that the shape of the fixing disc 1 is complementary to a corresponding recess in the fastening element head 10, so that the fixing disc 1 can be accommodated in this recess and the torque can be transmitted to the fixing disc. A reverse design is also possible. As an alternative or in addition to form-fit connection, a force-fit connection between the fastening element head 10 and the fixing disc 1 is also possible. This means that a static friction is built up between the two components so that a torque exerted on the fastening element 2 can also be transmitted to the fixing disc 1 via this. For this purpose, for example, the fixing disc 1 has a higher coefficient of friction on at least part of the side which faces the fastening element head 10 than on the rest of the fixing disc 1.

Corresponding fastening elements 4 and 11 are shown in. FIGS. 3 and 4. FIG. 3 shows perspective top views of various embodiment examples of the fixing disc 1 according to the invention with corresponding exemplary connecting means 4 on the side of fixing disc 1 remote from the component to be fastened and FIG. 4 shows perspective views from beneath of various embodiment examples of the fastening element 2 according to the invention with corresponding exemplary connecting means 11.

FIG. 3a shows, for example, the design of fastening element 4 on the fixing disc 1 with two ramp-shaped projections 4a. These projections 4a serve on the one hand to produce a form-fit connection with corresponding recesses on the fastening element head 10, the bevels of the projections, which in the embodiment example shown here extend outwards, i.e. away from the central opening 6 of the fixing disc 1, also serve simultaneously as centring aid for the head 10 of the fastening element 2. The flanks of the projections 4a, on the other hand, serve to absorb the torque, which is transmitted from the fastening element head 10 to the fixing disc 1. FIG. 3b shows sawtooth-like incisions 4b or recesses 4b in the fixing disc 1. These sawtooth-like incisions 4b can be used by complementary teeth or serrations of the fastening element head 10 to transmit torque. FIG. 3c shows a smooth fixing disc 1, which can be at least partially taken up by the fastening element head 10 to transmit torque. It is also possible that the smooth surface 4c of the fixing disc shown in this embodiment example has at least partially a higher coefficient of friction than the rest of the fixing disc 1, so that a frictional connection or a force-fit connection can he produced with the fastening element head 10. FIG. 3d shows sawtooth-like projections 4d on the fixing disc 1. These sawtooth-like projections 4d can interact with corresponding recesses in the fastening element head 10 to produce a form-fit connection so that torque can be transmitted. The person skilled in the art is aware that even if explicit embodiment examples of the design of fastening elements 4 are shown here, these can also be designed differently and are only shown here exemplarily. The person skilled in the art is aware that the design of the fastening element 4 must be such that it can transmit sufficient torque to turn the fixing disc 1 and remove the protective film with the selected cutting and/or friction means 5.

FIG. 4 shows perspective views from beneath of various embodiment examples of the fastening element 2 according to the invention, in particular the fastening element head 10, on the underside of which, i.e. the side which faces the first end region of the fastening element 2, i.e. the fixing disc 1, at least one connecting means 11 is arranged. This at least one connecting means 11 is capable of producing a connection with the at least one connecting means 4 of the fixing disc 1 so that torque can be transmitted from the fastening element 2 to the fixing disc 1. The at least one connecting means 11 in the embodiment examples of FIGS. 4a, 4b and 4d shown here is formed by recesses in the fastening element head 10 which can cooperate with projections on the fixing disc 1 and produce a form-fit connection. For example, the recesses 11a, 11d as shown in FIGS. 4a and 4d can produce a form-fit connection with the ramp-shaped projections 4a of the fixing disc 1 shown in FIG. 3a so that torque can be transmitted. The sawtooth-like recesses 11b shown in FIG. 4b can, for example, produce a form-fit connection with the sawtooth-like projections 4d of the fixing disc 1 shown in FIG. 3d. It is also possible, however, that the fastening element 11 on the fastening element head 10 is formed by projections, as shown for example in FIG. 4c, where the fastening element 11 is formed by the sawtooth-like projections 11c. These sawtooth-like projections 11c can, for example, engage in a correspondingly complementary recess in the fixing disc 1. Corresponding recesses 4b are shown, for example, in the fixing disc in FIG. 3b.

The person skilled in the art is aware that the fastening elements 4 and 11 of the fixing disc 1 and the fastening element head 10 can be of any design but must complement each other so that a corresponding torque exerted on the fastening element 2 can also be transmitted to the fixing disc.

Figure 5:
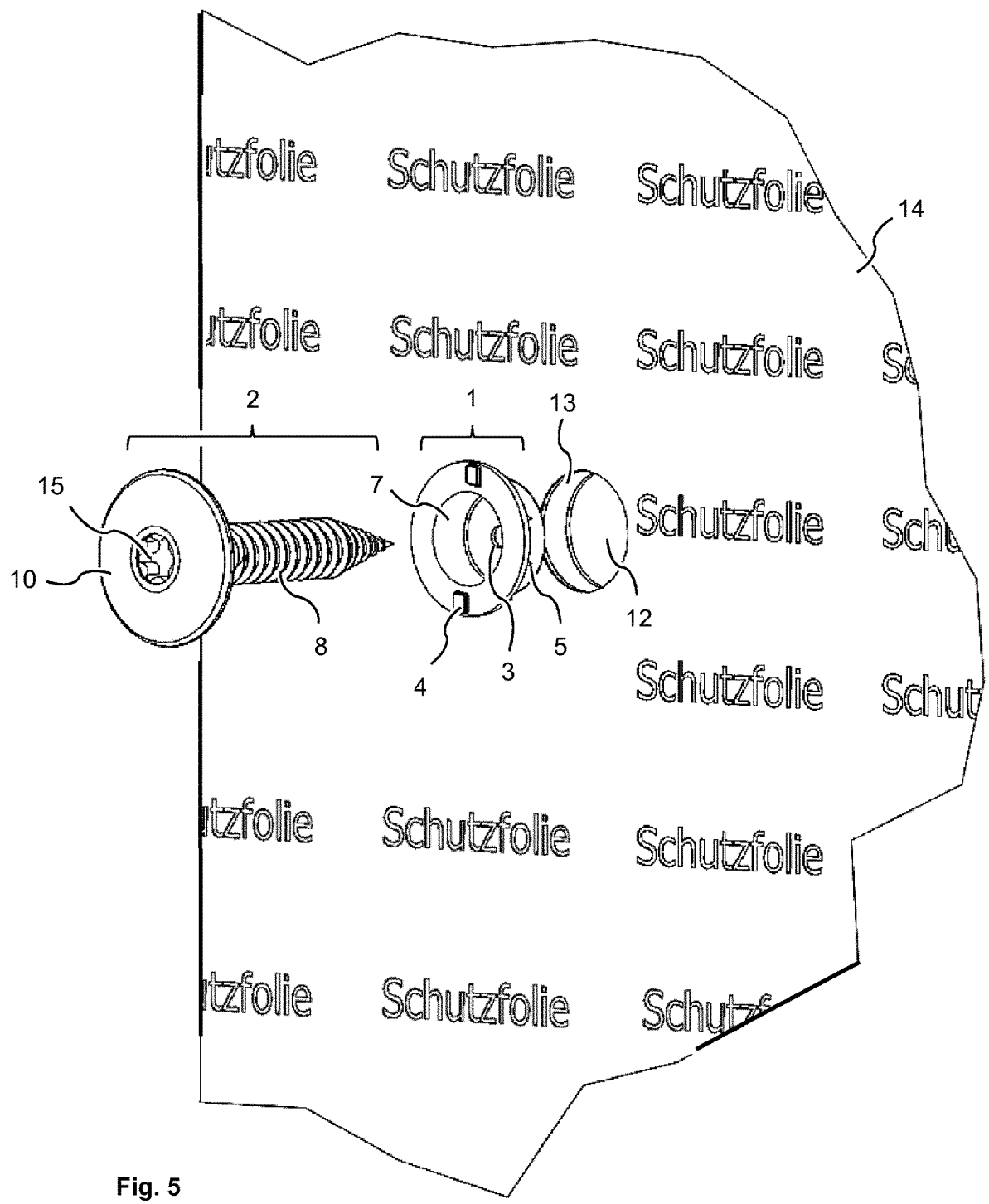
FIG. 5 shows a perspective view of an exemplary facade panel with protective foil arranged on it and an embodiment example of a fixing disc according to the invention with a fastening element according to the invention.

FIG. 5 shows a perspective view of an exemplary facade panel 13 with a protective film 14 [=Schutzfolie] arranged on it and an embodiment example of a fixing disc 1 according to the invention with a fastening element 2 according to the invention. In the embodiment example shown here, the facade panel 13 has an opening or hole 12 which essentially corresponds in diameter to the extension 7 of the fixing disc 1. This means that the extension 7 of the fixing disc 1 can be introduced into hole 12 in the facade panel 13. I.e. with the extension 7 it is possible to fix the fixing disc 1 relative to the hole 12. In the embodiment example shown here, the fixing disc 1 has a larger diameter than the hole 12 in the facade panel 13, i.e. the fixing disc 1 rests on the protective film 14 when the extension 7 is introduced into the hole 12 in the facade panel 13. The base 3 of extension 7 has an opening which forms a fixing means for the fastening element 2 which can be introduced into the opening. The opening holds the fastening element 2 in the middle of the extension 7 and thus in the middle of the hole 12 of the facade panel 13 at least during the initial mounting in the predetermined position. I.e. the fastening element 2 is held in such a way that it has a substantially equal distance to the edge or wall of the hole 12. The fastening element 2 can be turned with a mounting tool—not shown here. The rotation of the fastening element 2 can be achieved, for example, by engaging a mounting tool with a torx-shaped bit in the torx-shaped recess 15 in the head 10 to of the fastening element 2 and thus transmitting torque from the mounting tool to the fastening element 2. When the fastening element 2 is turned, the fastening element 2 moves into the substructure, i.e. the distance between the fixing disc 1 and the head 10 of the fastening element 2 is reduced. If the head to of the fastening element 2 contacts the fixing disc 1, then recesses 11 on the head 10 of the fastening element 2 can to accommodate the projections 4 of the fixing disc 1 on the side remote from the facade panel 13 and a form-fit connection can be produced. Once a form-fit connection has been produced, the fastening element 2 and the fixing disc 1 rotate simultaneously. This means that the cutting and/or friction means 5 arranged on the fixing disc 1, which is located on the side of the fixing disc 1 which faces the facade panel 13, is moved over the protective film 14 located on the facade panel 13. This results in the protective film 14 being cut or removed at least below the region covered by the fixing disc 1. In the embodiment example shown here, this is at least the region that extends around hole 12 and essentially corresponds to the diameter of the fixing disc 1. This region can also be referred to as the edge region of hole 12. This means that after mounting the fastening element 2, the protective film 14 is cut or removed at least in the edge region of the hole 12, i.e. the region below the fixing disc 1 or the region of the facade panel 13 covered by the fixing disc 1, so that the protective film 14 can then be removed without the remains around the region of the hole 12 having to be subsequently removed cumbersomely.

The invention claimed is:

1. A fixing disc (1) for initially fixing a fastening element (2) in an opening of a facade panel having a protective film on at least one side, the fixing disc (1) comprising:
    a fixing means for initially holding the fastening element (2) in a predetermined position relative to the opening during mounting of the fastening element (2) in the façade panel opening;
    at least one connecting means (4) for at least temporarily producing a connection between the fixing disc (1) and the fastening element (2); and
    at least one cutting and/or friction means (5) on that side of the fixing disc (1) which is adapted to face the at least one façade panel side having the protective film, said cutting and/or friction means (5) being adapted to cut into and/or remove a defined region of the protective film.

2. The fixing disc (1) according to claim 1, wherein the fixing disc (1) comprises a diameter which is larger than the diameter of the opening.

3. The fixing disc (1) according to claim 1, wherein the fixing means is formed by a central opening (6) in the fixing disc (1) and at least one holding means (3).

4. The fixing disc (1) according to claim 3, further comprising an extension sleeve (7) which
   extends around the central opening (6) of the fixing disc (1) and
   extends from the side of the fixing disc (1) which faces the at least one facade panel side having the protective film,
   wherein the extension sleeve (7) is adapted to be introduced at least partially into the opening.

5. The fixing disc (1) according to claim 1, wherein the connecting means (4) produces a form-fit or force-fit connection between the fixing disc (1) and the fastening element (2).

6. The fixing disc (1) according to claim 5, wherein the connecting means (4) is formed by at least one projection and/or at least one recess on the side of the fixing disc (1) remote from the façade panel to be fastened for producing a form-fit connection with the fastening element (2).

7. The fixing disc (1) according to claim 5, wherein the façade panel side remote from the façade panel to be fastened has a higher coefficient of friction than the rest of the fixing disc (1) for producing a force-fit connection with the fastening element (2).

8. The fixing disc (1) according to claim 1, wherein the fixing disc (1) is made of plastics material and is monolithically constructed.

9. A system for fastening a façade panel having a protective film on at least one side, comprising:
   a fixing disc (1) according to claim 1;
   a fastening element (2) for fastening components, facade panels, wherein the fastening element (2) includes
      a first end region (8) for anchoring the fastening element (2) in an underground or a substructure, and
      a second end region (9) comprising a fastening element head (10), the fastening element head (10) having a larger diameter than the rest of the fastening element (2) and including, on the side which faces the first end region (8), at least one connecting means (11) for producing a connection between the fastening element head (10) and a fixing disc (1).

10. A fastening element (2) adapted to be used with a fixing disc (1) for fastening facade panels, wherein the fastening element (2) comprises:
   a first end region (8) for anchoring the fastening element (2) in an underground or a substructure; and
   a second end region (9) comprising a fastening element head (10), the fastening element head (10) having a larger diameter than the rest of the fastening element (2) and including, on the side which faces the first end region (8), at least one connecting means (11) adapted to produce a connection between the fastening element head (10) and a fixing disc (1) adapted to cut into and/or remove a defined region of a protective film on said façade panel.

11. The fastening element (2) according to claim 10, wherein the connecting means (11) includes a form-fit or force-fit connection adapted to connect the fastening element head (10) and the fixing disc (1).

12. The fastening element (2) according to claim 11, wherein the connecting means (11) is formed by at least one recess and/or at least one projection on the fastening element head (10).

13. The fastening element (2) according to claim 11, wherein the fastening element head (10) on the side which faces the first end region (8) at least partially has a higher coefficient of friction than the rest of the fastening element (2) adapted to produce a force-fit connection with a fixing disc (1).

14. A method for cutting and/or removing a defined region of a protective film on a facade panel, when mounting a fastening element (2) in an opening of the façade panel to be fastened, wherein the method comprises the following steps:
   arranging a fixing disc (1) at least partially in the opening;
   arranging the fastening element (2) in the region of a fixing means of the fixing disc (1);
   mounting the fastening element (2) by rotating the fastening element (2), wherein during the mounting of the fastening element (2) at least temporarily a form-fit or force-fit connection is produced between the fastening element (2) and the fixing disc (1), so that the rotation of the fastening element (2) is transmitted to the fixing disc (1) and the fixing disc (1) rotates; and
   cutting and/or removing the protective film on the façade panel by at least one cutting and/or friction means on the side of the rotating fixing disc (1) which faces the façade panel.

15. The method according to claim 14, the method further comprising:
   removing the remaining protective film around the defined region.

* * * * *